United States Patent [19]
Takeda et al.

[11] Patent Number: 5,537,279
[45] Date of Patent: Jul. 16, 1996

[54] TAPE CASSETTE AND MAGNETIC RECORDING/REPRODUCING DEVICE

[75] Inventors: Hidekazu Takeda, Fujisawa; Nobuyuki Kaku, Kanagawa-ken; Tomochika Yamashita, Yokohama; Yoshimi Maehara, Otsu; Mikihisa Inoue, Otokuni-gun; Hikaru Mizutani, Toyonaka, all of Japan

[73] Assignees: Hitachi Maxell, Ltd., Osaka-fu; Hitachi, Ltd., Tokyo, both of Japan

[21] Appl. No.: 279,895

[22] Filed: Jul. 25, 1994

Related U.S. Application Data

[63] Continuation of Ser. No. 963,666, Oct. 20, 1992, abandoned.

[30] Foreign Application Priority Data

Oct. 21, 1991 [JP] Japan ................................ 3-272176
Jan. 28, 1992 [JP] Japan ................................ 4-038645

[51] Int. Cl.⁶ .......................................... G11B 23/02
[52] U.S. Cl. .......................................... 360/132
[58] Field of Search .................................. 360/132, 134, 360/74.6, 74.2; 242/199, 198, 347

[56] References Cited

U.S. PATENT DOCUMENTS

| | | |
|---|---|---|
| 4,343,024 | 8/1982 | Kawai . |
| 4,562,497 | 12/1985 | Morinaga et al. ............ 242/199 |
| 4,669,021 | 5/1987 | Wakui et al. ............ 360/132 |
| 4,743,984 | 5/1988 | Ryan ............ 360/132 |
| 4,791,504 | 12/1988 | Igarashi et al. ............ 360/132 |
| 4,814,923 | 3/1989 | Kawada et al. ............ 360/132 |
| 4,918,558 | 4/1990 | Igarashi et al. ............ 360/132 |
| 4,993,661 | 2/1991 | Tollefson ............ 360/132 |
| 5,311,030 | 5/1994 | Higuchi et al. ............ 360/132 |
| 5,316,234 | 5/1994 | Honsho et al. ............ 360/132 |

FOREIGN PATENT DOCUMENTS 0169546  1/1986  European Pat. Off. .
8813593  3/1990  Germany .

*Primary Examiner*—Stuart S. Levy
*Assistant Examiner*—Allen Cao
*Attorney, Agent, or Firm*—Birch, Stewart, Kolasch & Birch

[57] ABSTRACT

A tape cassette comprising an insertion opening disposed in a main body case and a detecting optical path, for detecting the leading and rear ends of a tape, interposed between the insertion opening and an optical path window formed in the left and right side walls of the case, wherein a first distinguishing member, rotatably inserted into an upper portion of the insertion opening, is supported to be vertically slidable, and a mechanism for holding the first distinguishing member in each state is disposed between the first distinguishing member and the main body case, thereby to allow a tape deck to have a simple internal construction even though the tape cassette is of a smaller size, and to provide a construction of the detecting opening preferable for detecting cassette information so that the tape cassette can be used in a compatible form.

9 Claims, 11 Drawing Sheets

TAPE CASSETTE AND MAGNETIC RECORDING/REPRODUCING DEVICE

This application is a continuation of application Ser. No. 07/963,666 filed on Oct. 20, 1992, now abandoned.

BACKGROUND OF THE INVENTION

1. Field of the Invention

The present invention relates to a tape cassette for accommodating a magnetic tape and more particularly to the miniaturization of in addition, the construction of a detecting mechanism of a device corresponding to the tape cassette.

2. Description of the Related Art

In an 8 mm tape cassette, a detecting opening for preventing an erroneous erasure of the recorded content is provided in a rear corner of a tape cassette case. A user slides a cover which opens or closes the detecting opening and as a result, a device decides whether or not the recorded content can be erased. In the device, a sensor for deciding whether the detecting opening is opened or closed is disposed immediately below the detecting opening. Thus, the information of the tape cassette is decided by the information obtained by the sensor. A similar detecting opening is provided in a tape cassette of a VHS or a DAT.

The tape cassette accommodates a detecting optical path for detecting the leading and rear end of a tape. In the 8 mm video tape cassette, an insertion opening for inserting a detector of an emission side is provided in a triangular space enclosed by right and left tape reels and the inner wall of a tape loading pocket. A detecting optical path is interposed between the insertion opening and an optical path window formed on the right and left side walls of the case of the tape cassette. In adopting an optical method for detecting the ends of the tape to be carried out by this construction, it is normal that a rotation locking member for locking the rotation of the tape reel is disposed in a space, enclosed by both reels, disposed in the rear of the tape cassette. In detecting the tape ends by another method, a rotation locking member for locking the tape reel can be disposed in a space enclosed by a tape path disposed in the front of the tape cassette and the side walls thereof. This construction is effective for preventing the loosening of the tape disposed inside the tape cassette because the reel is urged toward the rear of the tape cassette. The former method is adopted in the tape cassette of a VHS or an 8 mm tape cassette. The latter is adopted in the tape cassette of office use, ½ inch digital (D2 format). The tape cassette of a VHS, Beta-max system, and 8 mm video system are known and the tape cassette of D2 format is described in page 358 through 374 of a SMPTE Journal, March 1986.

The position of a distinguishing member is important for applying tape cassettes of a large size and a smaller size to the same tape deck. For example, if the distinguishing member is disposed in the same position as that of the 8 mm video tape cassette currently used, namely, if the distinguishing member is provided in a rear corner of the case of the tape cassette, it is necessary to provide a detecting tool for deciding the change-over state of the distinguishing member suitable for both tape cassettes of a large size and a smaller size or move one detecting tool according to tape cassettes of a large size and a smaller size. Regardless of whether one detecting tool or two detecting tools are provided, the tape deck has unavoidably a complicated internal construction.

As disclosed in Japanese Utility Model Laid-Open Publication No. 62-888, it is possible to dispose the distinguishing member in a space enclosed by left and right tape reels. But this construction does not allow a detecting optical path to be provided in an appropriate position. In particular, in a tape cassette of the small size, the detecting optical path is unavoidably disposed in a tape loading pocket. In this case, it is impossible to provide an opening for insertion a detector of the emission section of a magnetic recording/reproducing device inside the tape cassette case.

In making the tape cassette compatible, it is necessary to simplify the internal construction of a tape deck. As a result, some parts of the tape cassette are disposed at inappropriate positions. On the contrary, in order to dispose parts appropriately in the tape cassette, the internal construction of the tape deck is unavoidably complicated.

As another method, the leading and rear ends of the tape are detected by the leading end of a magnetic tape fed out from the tape cassette. In this case, it is necessary to make the leading end of the magnetic tape longer than that of the tape cassette of the VHS system and the 8 mm video system which detects the leading and rear ends of the tape inside the tape cassette. As a result, the leading end of the magnetic tape is caught by a cylinder in loading the tape in the tape cassette, which may damage a cylinder head. In addition, since a mechanism for detecting the tape ends is disposed outside the tape cassette, the device becomes unavoidably large and complicated.

SUMMARY OF THE INVENTION

It is an object of the present invention to provide a tape cassette which allows a tape deck to have a simple internal construction even though the tape cassette is of a smaller size.

It is another object of the present invention to provide a tape cassette in which the construction of a detecting opening is preferable for detection cassette information so that the tape cassette can be used in a compatible form.

It is a further object of the present invention to provide a magnetic recording/reproducing device having a simple construction capable of detecting the leading and rear ends of a tape and the information of the tape cassette with a high accuracy.

In accomplishing these and other objects of the present invention, there is provided a tape cassette comprising an insertion opening disposed in a main body case and a detecting optical path, for detecting the leading and rear ends of a tape, interposed between the insertion opening and an optical path window formed in the left and right side walls of the case, wherein a first distinguishing member for indicating the state of the tape cassette is disposed in an upper portion of the insertion opening. The first distinguishing member is movably held by the main body case so that the first distinguishing member occupies a plurality of states including a state for preventing a second distinguishing member from moving upward together with a light-projecting section within the insertion opening.

The first distinguishing member is rotatably inserted into an upper portion of the insertion opening. The first distinguishing member is supported to be vertically slidable. A mechanism for holding the first distinguishing member in each state is disposed between the first distinguishing member and the main body case.

According to another aspect of the present invention, there is provided a magnetic recording/reproducing device accommodated in a tape cassette comprising an insertion opening disposed in a main body case and a detecting optical path, for detecting the leading and rear ends of a tape, interposed between the insertion opening and an optical path window formed in the left and right side walls of the case, comprising a distinguishing member slidably movable coaxial with an emission section for detecting the ends of the tape, urging means for urging the distinguishing member upward an arm integral with the distinguishing member and vertically slidable, and a sensor which is turned on or off according to the vertical position of the arm.

Preferably, the detection member is cylindrical so that it is vertically slidable along the peripheral surface of an emission element or light-projecting section or pin-shaped so that it is vertically slidable along the axis of the emission section.

In a tape cassette having a detection opening into which the light-receiving section for detecting the leading and rear ends of a magnetic tape is inserted, the shaft of a member for locking the rotation of a tape reel is mounted coaxially with the detection opening.

According to the above construction, the first distinguishing member is provided in the insertion opening. Therefore, the light-projecting section and the second distinguishing member disposed above the light-projecting section can be accommodated both in a large size tape cassette and a smaller size tape cassette. In addition, the first distinguishing member can be appropriately disposed in both a large size tape cassette and a small size tape cassette with the detection optical path placed at an appropriate position.

The first distinguishing member is moved to be disposed at plural positions, thus indicating the state of the tape cassette. The vertical level of the second distinguishing member is changed according to the position change of the first distinguishing member. Thus, the state of the tape cassette can be decided.

Owing to the provision of the tape cassette information detection opening, the leading and rear ends of the tape can be optically detected by the light-receiving section which detects beams emitted by the light projecting section. The distinguishing member coaxial with the light projecting section is moved downward or upward according to the state of the tape cassette information detection opening. The arm integral with the distinguishing member becomes in contact with the terminal of the sensor or out of contact therewith according to the downward movement of the distinguishing member or the upward movement thereof. As a result, the sensor is turned on or off, thus allowing the detection of the state of the tape cassette.

Preferably, the detection member is cylindrical or pin-shaped. Consequently, the construction of the information detecting mechanism is simple. Further, a long radial bearing can be used in the sliding portion of the information detecting mechanism. Accordingly, the detection member can be reliably moved vertically.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
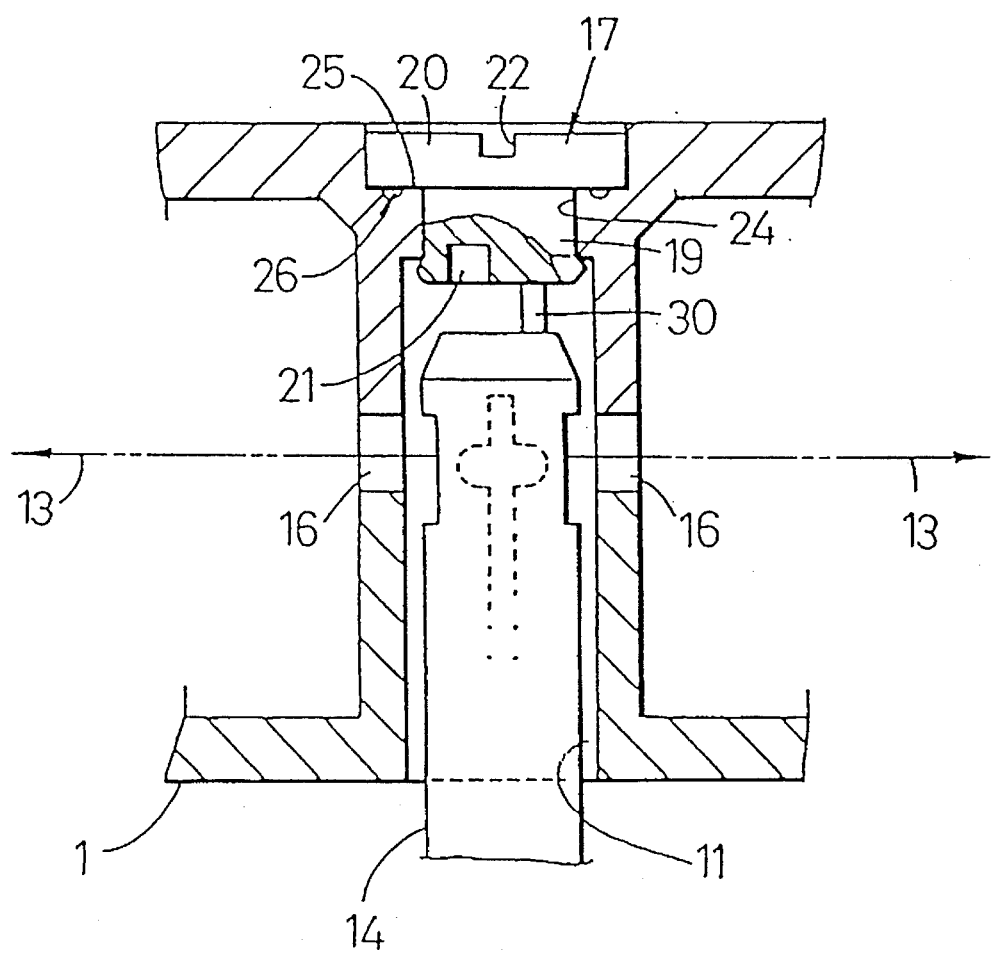
FIG. 1 is a longitudinal sectional view showing an insertion opening of an emission section and a distinguishing member according to a first embodiment.

Before the description of the present invention proceeds, it is to be noted that like parts are designated by like reference numerals throughout the accompanying drawings.

The embodiments of the present invention will be described below with reference to the drawings.

Embodiment of Tape Cassette

FIGS. 1 through 5 show a first embodiment in which the present invention is applied to a video tape cartridge. In this system, tape cartridges large in case size and small in case size are used as a recording medium.

Figure 2:
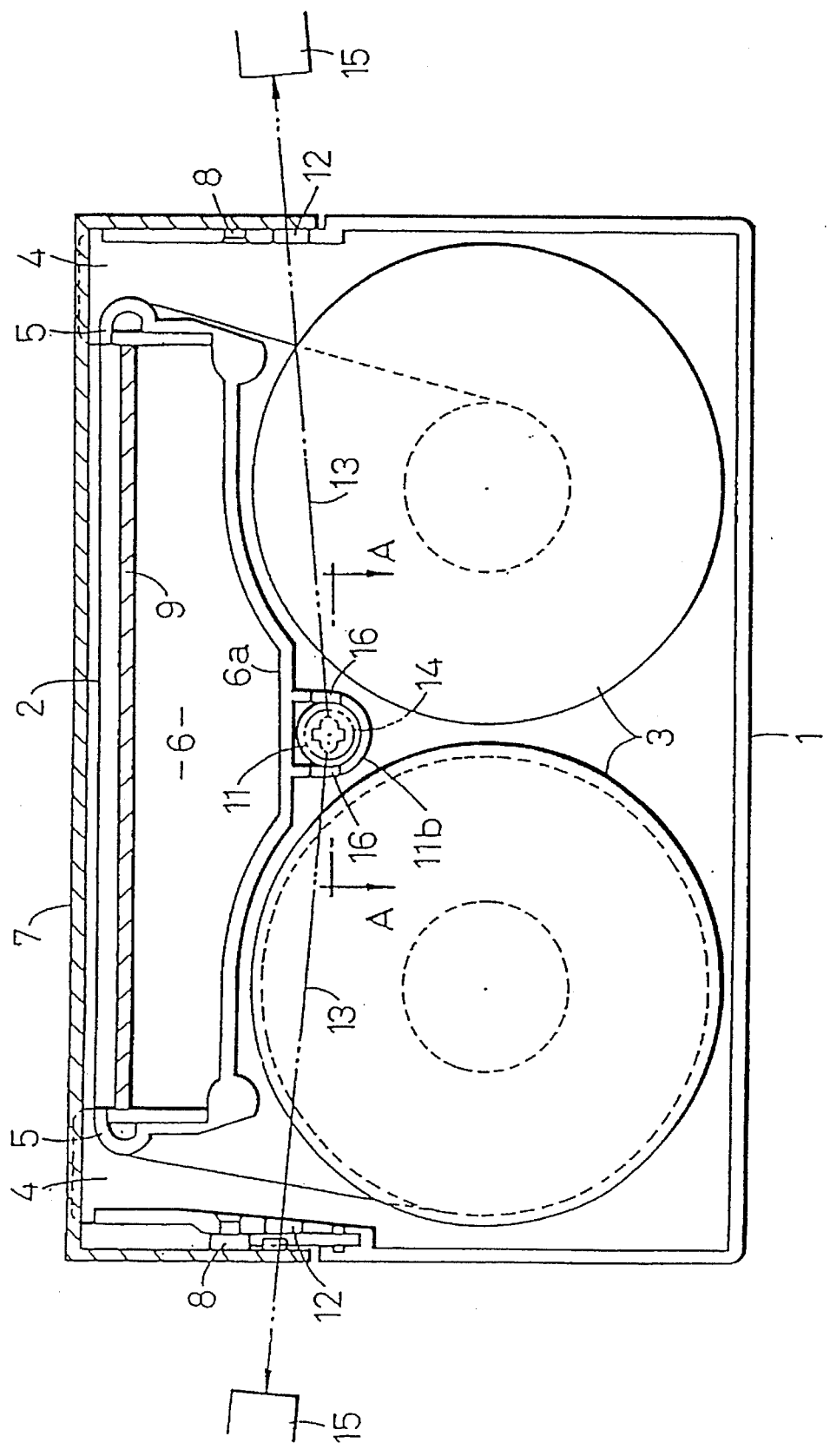
FIG. 2 is a plan view showing the schematic inner construction of a tape cartridge.

Referring to FIG. 2, a tape cartridge comprises a main body case 1 comprising an upper case and a lower case, made of plastic, coupled with each other. The main body case 1 accommodates tape reels 3 and 3, on which a tape 2 is wound, in the left and right thereof. The tape 2 is fed out from one of the tape reels 3 to the front of the case 1 and wound around the other tape reel 3 via tape guides 5 and 5 having left and right tape feed-out openings 4 and 4 formed at the left and right of the front of the case 1. A tape loading pocket 6 is concaved between the left and right tape feed-out openings 4 and 4.

A front cover 7 for covering the front and upper surfaces of the pocket 6 is disposed on the front surface of the case 1. A spring, not shown, urges the front cover 7 so that the front cover 7 is pivotal in the closing direction about a shaft 8. A rear cover 9 for protecting the tape 2 is disposed rearward of the tape 2 and moves from the pocket 6 toward the upper surface of the case 1 in unison with the pivotal upward motion of the front cover 7.

An insertion opening 11 is disposed in the center of the case 1 in the longitudinal direction thereof, namely, in a triangular space enclosed by the tape reels 3 and 3 and the inner wall 6a of the pocket 6. A detection optical path 13 is insertion between the insertion opening 11 and an optical path window 12 formed in the left and right side walls of the case 1.

The detection optical path 13 crosses a tape path disposed between the tape reels 3, 3 and the tape guides 5, 5. An emission section 14 and a light-receiving sensor 15 are provided on a magnetic recording/reproducing device.

Figure 3:
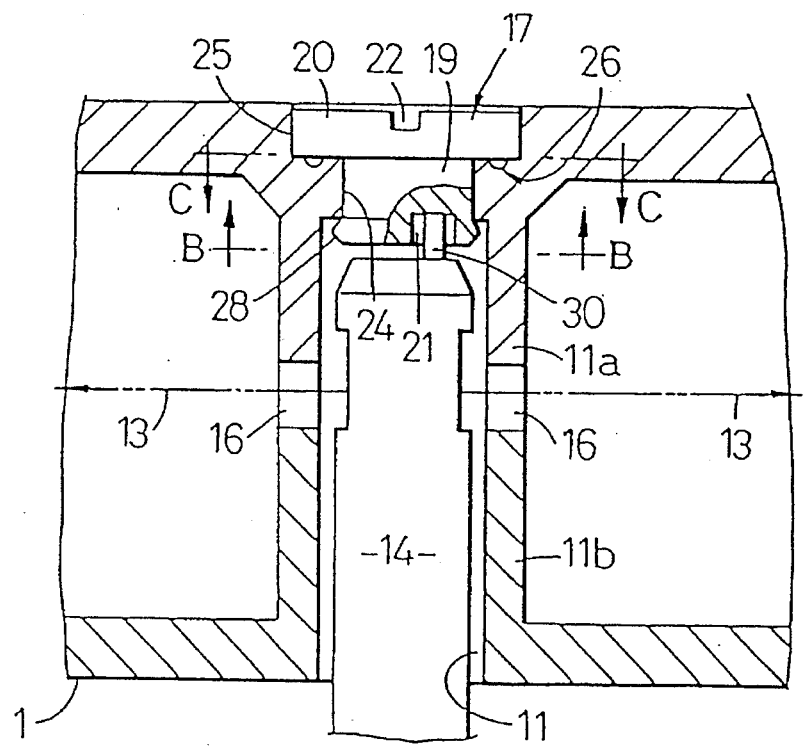
FIG. 3 is a sectional view taken along the line A—A of FIG. 2.

Referring to FIG. 3, the insertion opening 11 is partitioned by bosses 11a and 11b projecting from the upper and lower cases, respectively and opposed to each other. A projecting window 16 is provided in the left and right connecting portions of the bosses 11a and and 11b. A distinguishing member 17 for indicating the state of the tape cartridge is disposed in a space above the insertion opening 11.

Figure 4:
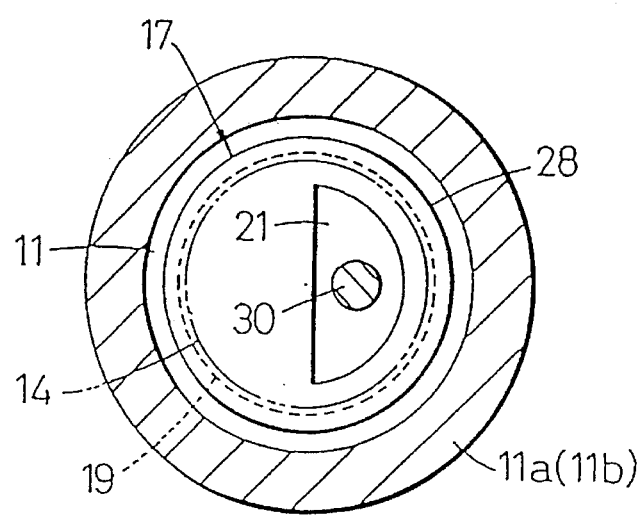
FIG. 4 is a sectional view taken along the line B—B of FIG. 3.

The distinguishing member 17 made of plastic comprises a shaft 19 and an operation head 20 formed above the shaft 19. A distinguishing opening 21, sectionally semicircular, is formed on the lower end surface of the shaft 19, as shown in FIG. 4. An operation groove 22 and an indicator for indicating the operation position of the distinguishing member 17 are formed on the upper surface of the head 20.

In order to mount the distinguishing member 17 on the case 1, there are formed, on the upper end of the insertion opening 11, an opening 24 continuous with the insertion opening 11 and a seat 25 for accommodating the entire head 20. The shaft 19 of the distinguishing member 17 is inserted into the opening 24 from the upper surface of the case 1 to rotatably support the distinguishing member 17. An engaging portion 28 formed along the periphery of the lower end of the shaft 19 engages the periphery of the opening 24, thus preventing the distinguishing member 17 from being removed upward therefrom.

The distinguishing member 17 is held for each one-half rotation thereof. To this end, a mechanism 26 is provided in the sliding-contact portion between the head 20 and the seat 25.

Figure 5:
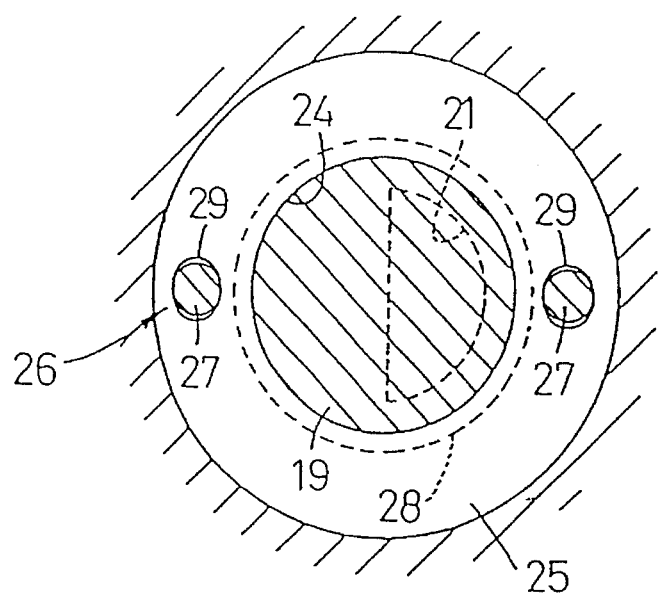
FIG. 5 is a sectional view taken along the line C—C of FIG. 3.

The mechanism 26 comprises two projections 27 formed on the lower end surface of the head 20 and two engaging concaves 29 formed on the seat 25 in correspondence with each projection 27. The projections 27 and the engaging concaves 29 are formed at a phase interval of 180° in the circumferential direction of the distinguishing member 17, respectively as shown in FIG. 5. The projection 27 engages the engaging concave 29 for each one-half rotation of the distinguishing member 17. Consequently, the distinguishing member 17 is held in position. At this time, the distinguishing opening 21 moves from the left to the right and vice versa with respect to the rotational axis of the shaft 19, each time the shaft 19 makes a one-half rotation, as shown in FIGS. 1 and 3.

A distinguishing pin 30 for detection the state change of the distinguishing member 17 projects from the upper end of the emission section 14. The distinguishing pin 30, eccentric with the emission section 14, serves as a means for distinguishing the state of the cartridge. The cartridge takes two positions. FIG. 3 shows one of the positions at which the upper end of the distinguishing pin 30 penetrates into the distinguishing opening 21. FIG. 1 shows the other position at which the distinguishing pin 30 is prevented from moving upward as a result of the contact between the upper end thereof and the lower end surface of the shaft 19. That is, the state of the tape cartridge is decided according to the difference in the level of the upper end of the distinguishing pin 30. In the first embodiment, the distinguishing member 17 is used to prevent an erroneous erasure of magnetic information, i.e., magnetic signals are recorded onto the tape 2 only when distinguishing pin 30 is in the distinguishing opening 21.

The above description is concerned when a small size tape cartridge compatibly used. Although the size of the large size tape cartridge and the length of a tape to be accommodated therein are greater than those of the small size tape cartridge, the construction of the large size tape cartridge case and the parts arrangement thereof are similar to those of the small size tape cartridge, and the thickness of the large size tape cartridge case is the same as that of the small size tape cartridge case.

According to the compatible tape cartridge of the above construction, since the distinguishing member 17 is disposed in the space located above the insertion opening 11, the distinguishing member 17 can be appropriately provided in the small tape cartridge having a small space, with the detection optical path 13 set at an appropriate position. In addition, the distinguishing pin 30 is provided in the emission section 14 and the state of the distinguishing member 17 is distinguished by utilizing the entering operation of the emission section 14 into the insertion opening 11. Thus, the mechanism of the magnetic recording/reproducing device can be prevented from being complicated in its construction. The position of the distinguishing member 17 can be easily changed by a tool such as a coin or a screwdriver.

Second Embodiment

Figure 6:
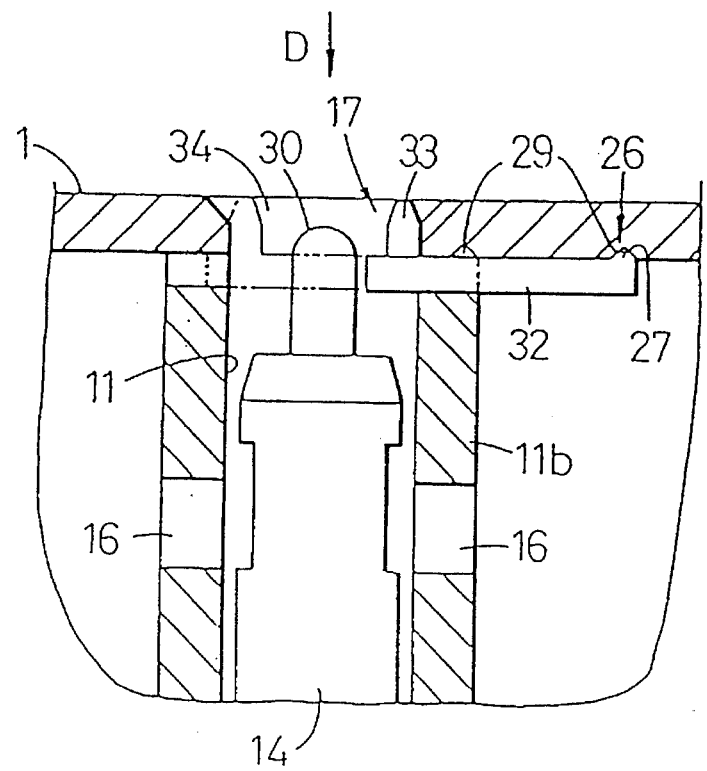
FIG. 6 is a longitudinal sectional view showing a distinguishing member according to a second embodiment.
Figure 7:
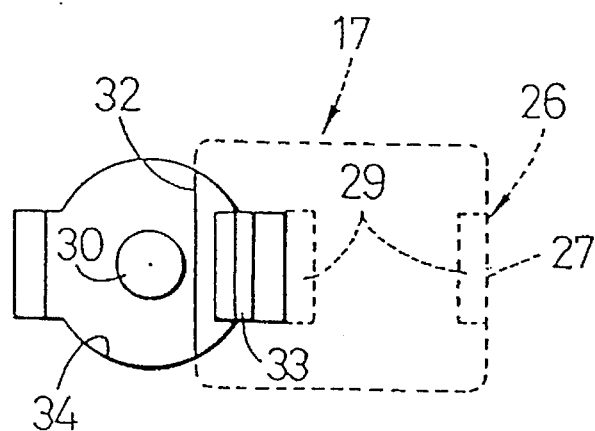
FIG. 7 is a sectional view taken along the line D of FIG. 6.

FIGS. 6 and 7 show a tape cassette according to a second embodiment of the present invention in which the configuration of the distinguishing member 17 and the form of supporting it are modified. In the second embodiment, the distinguishing member 17 comprises a flat shutter plate 32 and an operation plate 33 projecting upward from the shutter plate 32 supported between the boss 11b extending from the lower case and the upper wall of the upper case so that the shutter plate 32 is slidable horizontally.

The mechanism 26 comprising the projections 27 and the engaging concaves 29 is interposed between the shutter plate 32 and the inner surface of the upper wall of the upper case. The shutter plate 32 can be held in position both in the state in which the shutter plate 32 closes and opens the insertion or emission opening 11. The operation plate 33 can be operated from the upper surface of the upper case via a window 34 disposed on the upper wall of the upper case.

In the second embodiment, the state of the cartridge is detected by distinguishing whether the distinguishing pin 30 contacts the bottom surface of the shutter plate 32 or the upper end of distinguishing pin 30 moves upward toward the window 34.

Third Embodiment

Figure 8:
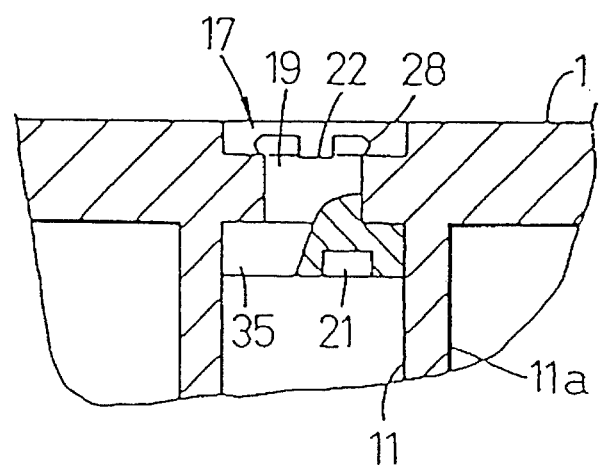
FIG. 8 is a longitudinal sectional view showing a distinguishing member according to a third embodiment.

The construction of the distinguishing member 17 according to the first embodiment may be modified to that as shown in FIG. 8. That is, a large-diameter flange 35, having a diameter larger than that of the shaft 19 which is inserted into the insertion opening 11, is provided in the lower end portion of the shaft 19, and the engaging portion 28 is provided in the upper end of the shaft 19.

That is, the force of the distinguishing pin 30 acting on the distinguishing member 17 inserted into the insertion opening 11 upward is received by the upper case via the flange 35. The distinguishing opening 21 is formed on the lower end surface of the flange 35.

Other Embodiments of The Tape Cassette

It is possible to pivot the distinguishing member 17 along the inner surface of the upper wall of the upper case so that the distinguishing member 17 closes or opens the insertion opening 11.

The distinguishing member 17 according to the first and third embodiments may be composed of two parts.

The state of the tape cartridge may be indicated in the state in which the distinguishing member 17 has been mounted in the insertion opening 11 and the state in which the distinguishing member 17 has been removed from the case 1.

It is possible to form three or more distinguishing openings 21 having a different depth on the distinguishing member 17 so as to indicate the state of the tape cartridge in three or more states.

The mechanism 26 may be composed of parts separate from those of the distinguishing member 17 and the case 1.

Embodiment of Magnetic Recording/Reproducing Device

Referring to FIGS. 9 through 14, the embodiments of the cassette information detection mechanism of the magnetic recording/reproducing device according to the present invention is described below.

The construction of the tape cassette to be mounted on the magnetic recording/reproducing device according to the embodiments described below is the same as that of the tape cassette according to the above-described second embodiment.

First Embodiment

Figure 9:
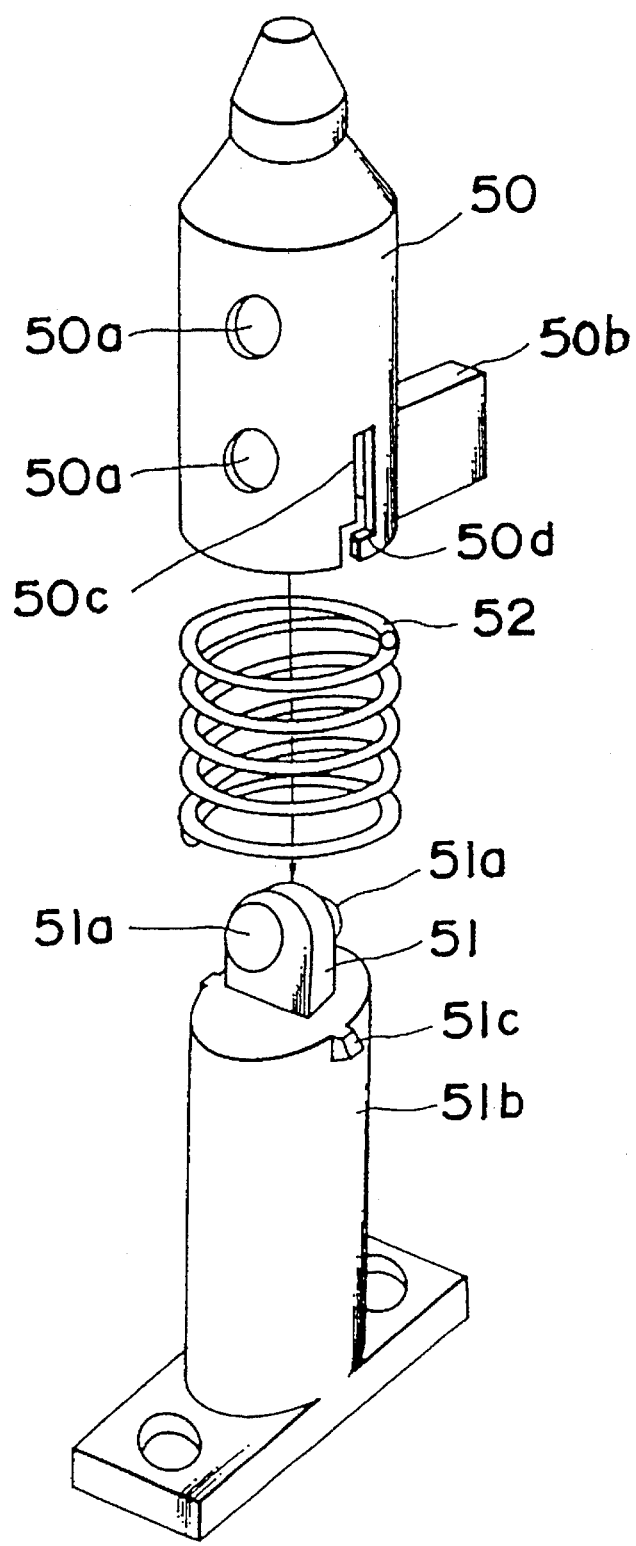
FIG. 9 is a perspective view showing the cassette information-detection mechanism of a magnetic recording/reproducing device according to a first embodiment.

FIG. 9 is a perspective view showing the construction of a cassette information detection mechanism according to a first embodiment of the present invention. A sliding member 50 slides along the peripheral surface 51b of an emission element 51 vertically or light-projecting section. The sliding member 50 has four through-holes 50a formed on the peripheral surface thereof; an arm 50b projecting radially from the peripheral surface thereof; and at least one sliding groove 50c formed vertically on the peripheral surface thereof. Two through-holes 50a are formed at a phase interval of 180° in the same level in the circumferential direction of the sliding member 50. The sliding member 50 is tapered in the upper portion thereof so that it can be inserted into the insertion opening 11. The cassette information detection mechanism further comprises a spring 52 for urging the sliding member 50 upward. An engaging portion 50d formed at the lower end of the sliding groove 50c engages a convex portion 51c formed on the peripheral surface 51b of the emission element 51. Consequently, the upward movement of the sliding member 50 is prevented and held at a predetermined position.

Figure 10:
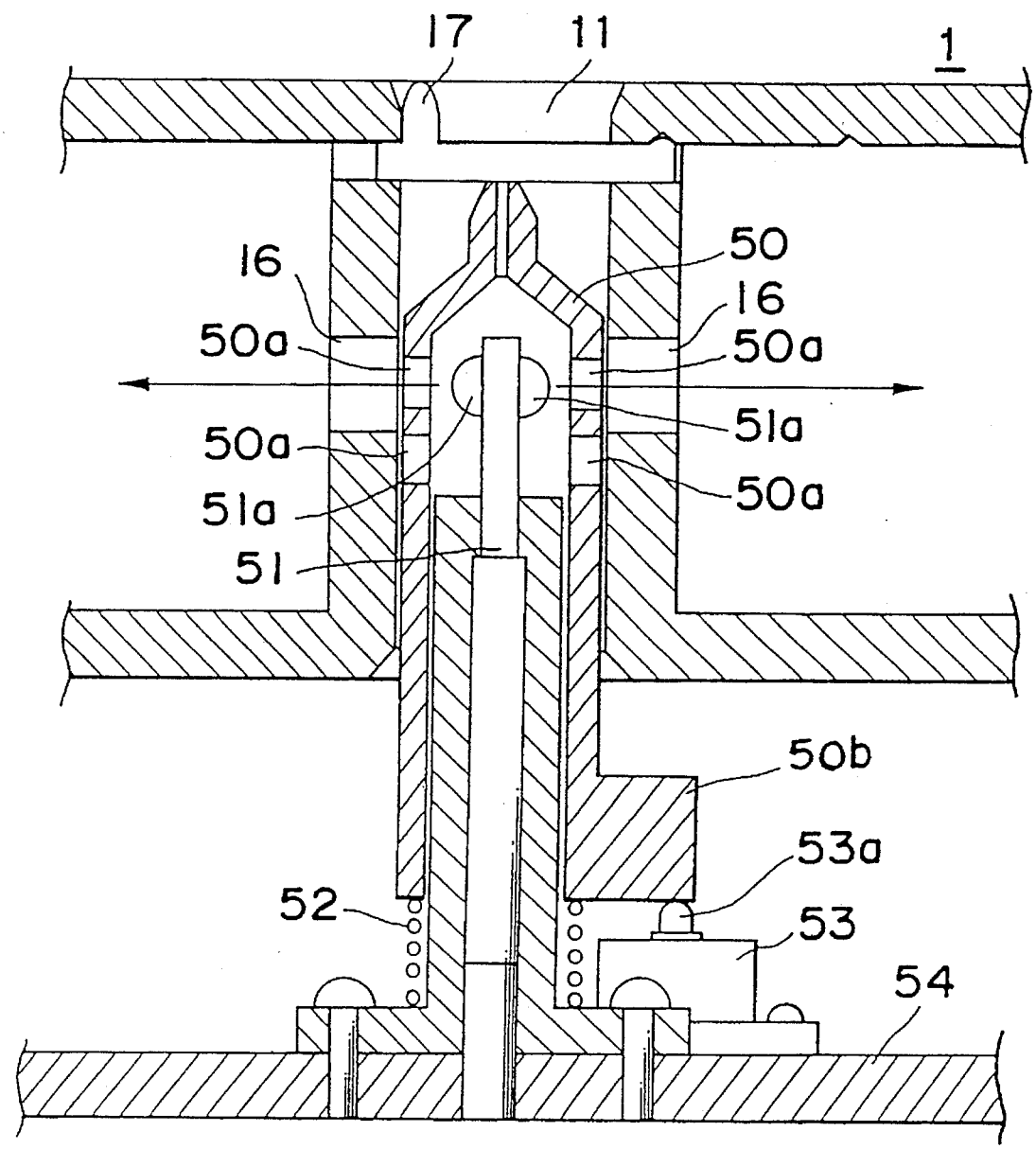
FIG. 10 is a sectional view showing the operation (ON state) of the cassette information-detection mechanism of the magnetic recording/reproducing device.
Figure 11:
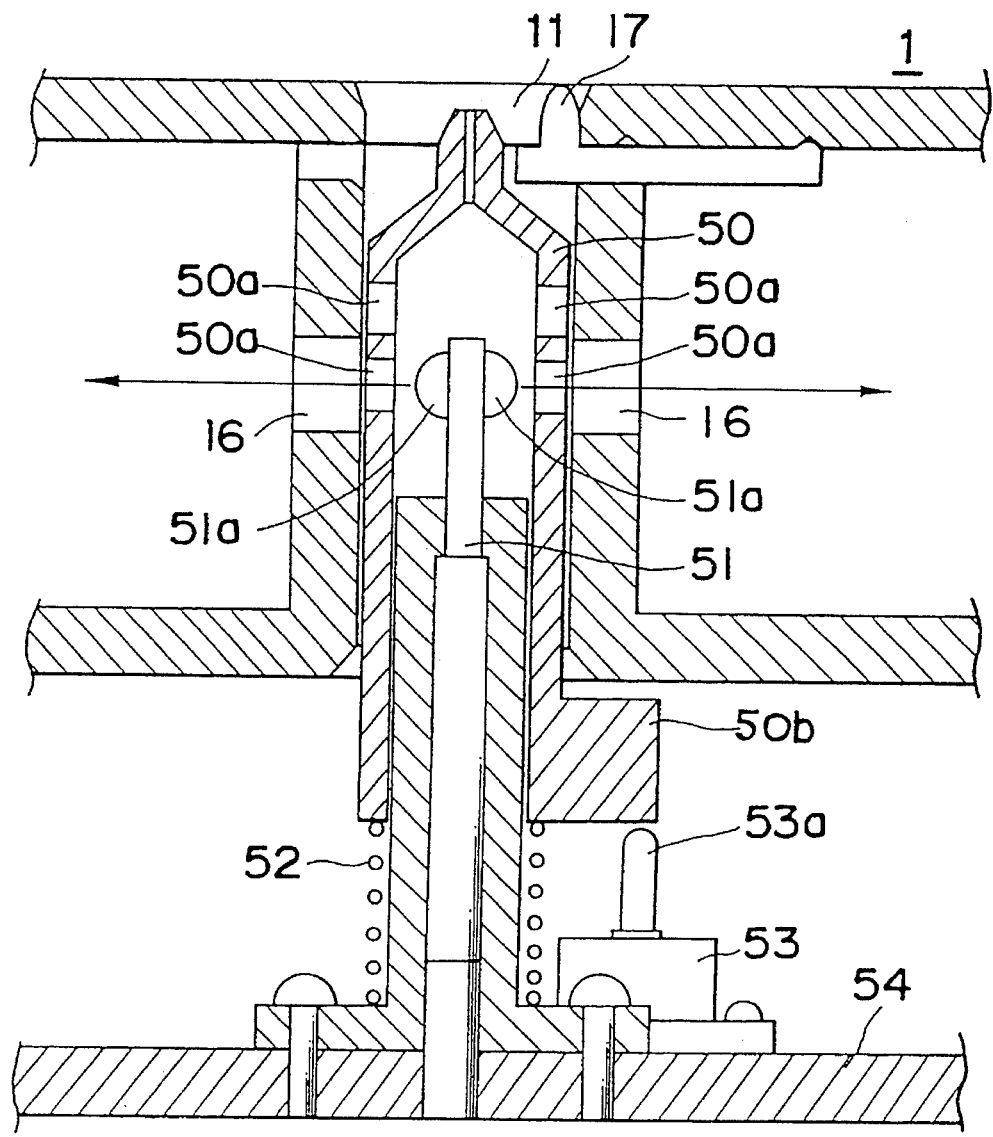
FIG. 11 is a sectional view showing the operation (OFF state) of the cassette information-detection mechanism of the magnetic recording/reproducing device.

FIGS. 10 and 11 are sectional views showing the operation of the cassette information detection mechanism.

FIG. 10 shows a state in which the insertion opening 11 is closed by the distinguishing member 17 and the sliding member 50 is disposed below the distinguishing member 17. The arm 50b presses a switch 53a of a cassette information detection sensor 53 downward when the sliding member 50 is placed below the distinguishing member 17. At this time, the sensor 53 fixed to a base 54 is turned on and beams emitted by the emission section 51a of the emission element 51, pass through the through-hole 50a disposed on an upper portion thereof and the projecting window 16, are introduced toward a light-receiving element as shown by arrows.

FIG. 11 shows a state in which the distinguishing member 17 is moved away from the lower position and as a result, the insertion opening 11 is opened and the sliding member 50 is placed at the upper position. At this time, the arm 50b of the sliding member 50 disengages from the switch 53a of the sensor 53. As a result, the sensor 53 is turned off. At this time, beams emitted by the emission section 51a of the emission element 51 pass through the through-hole 50a disposed in the upper portion thereof and the projecting window 16 and are introduced toward the light-receiving element as shown by arrows. Since the cassette information detection mechanism according to the present invention operates as described above, it reliably detects the information of the tape cassette without preventing the detection of the ends of the tape.

Second Embodiment

Figure 12:
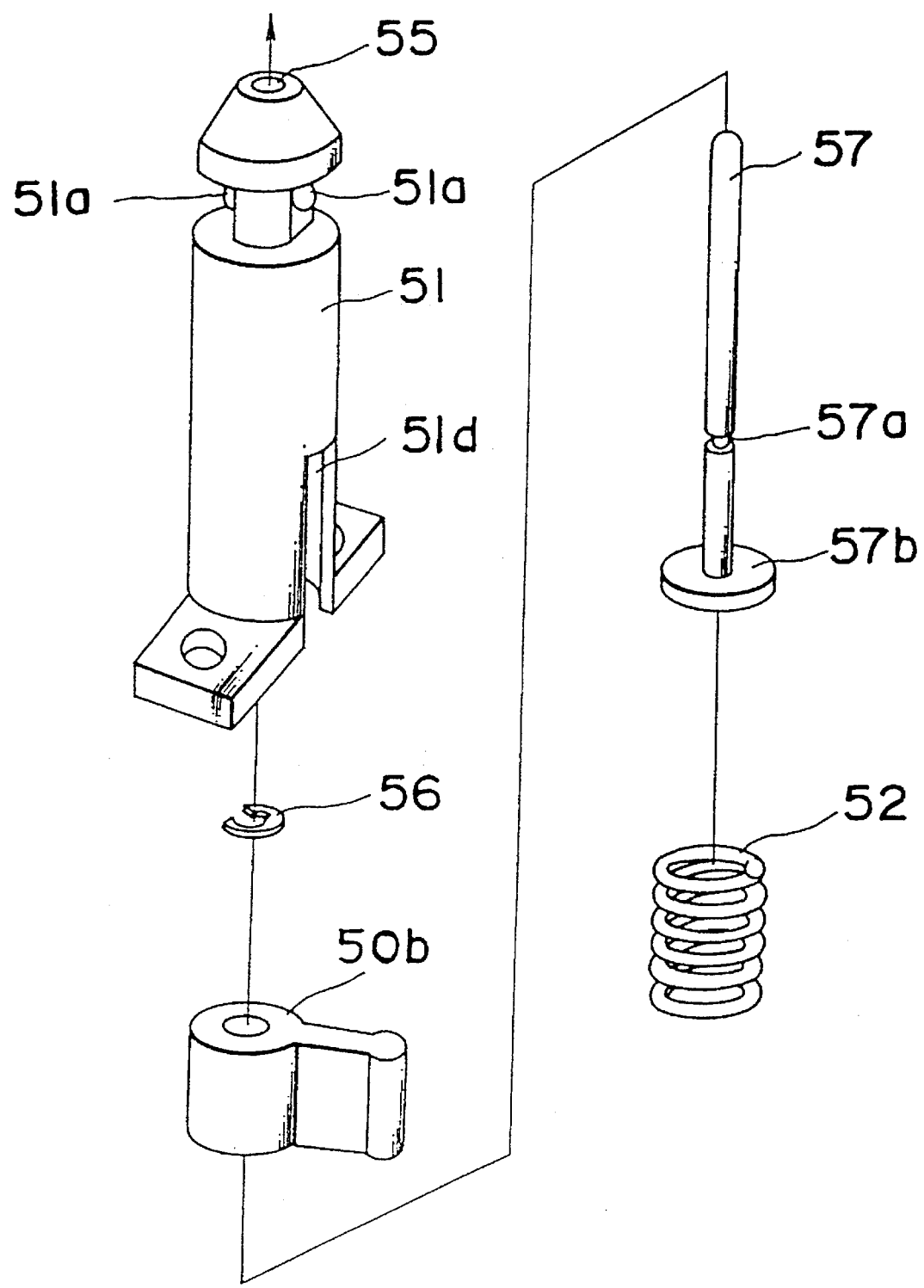
FIG. 12 is a perspective view showing the cassette information-detection mechanism of a magnetic recording/reproducing device according to a second embodiment.

FIG. 12 is a perspective view showing the construction of a cassette information detection mechanism according to a second embodiment of the present invention. The emission element 51 has a through-hole 55 in the center thereof and the emission section 51a at an upper portion thereof. The emission element 51 is mounted on the base 54 similarly to the first embodiment. An E-ring 56 for fixing the arm 50b to a detection pin 57 at a predetermined position thereof is fixed to a groove 57a of the detection pin 57. A spring 52 presses a disk 57b formed at the lower end of the detection pin 57, thus urging the detection pin 57 upward. The emission element 51 comprises a regulating groove 51d for regulating the pivotal motion of the arm 50b and allowing the arm 50b to move only vertically together with the detection pin 57.

Figure 13:
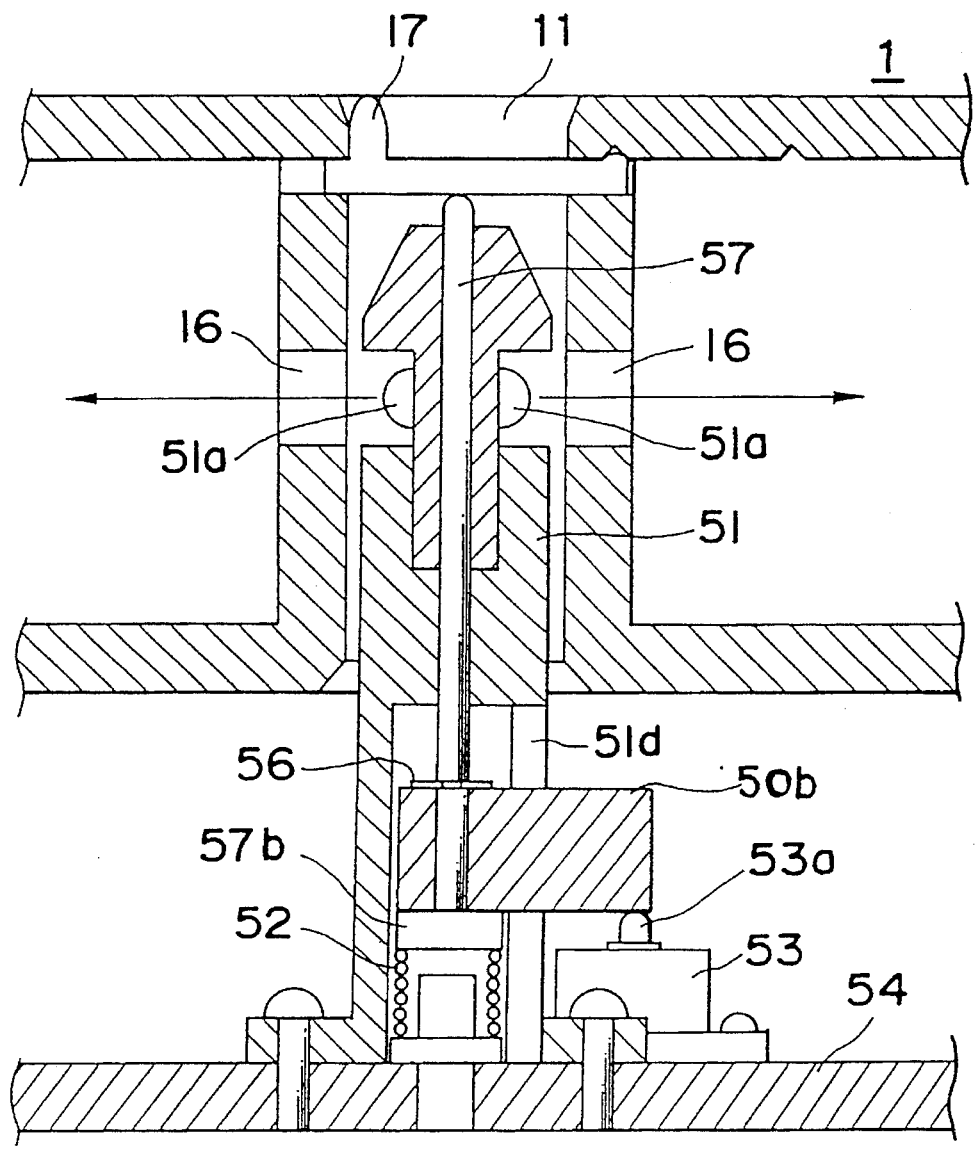
FIG. 13 is a sectional view showing the operation (ON state) of the cassette information-detection mechanism of a magnetic recording/reproducing device according to the second embodiment.

FIG. 13 shows a state in which the insertion opening 11 is closed by the distinguishing member 17 and the detecting pin 57 is disposed below the distinguishing member 17. Similarly to the first embodiment shown in FIG. 10, the arm 50b presses the terminal 53a of the sensor 53, fixed to a predetermined position of the base 54, downward when the detection pin 57 is disposed below the distinguishing member 17. At this time, the sensor 53 is turned on. Beams emitted by the emission section 51a of the emission element 51 pass through the projecting window 16, as shown by arrows and are introduced toward the light-receiving element 15 because nothing intercepts them.

Figure 14:
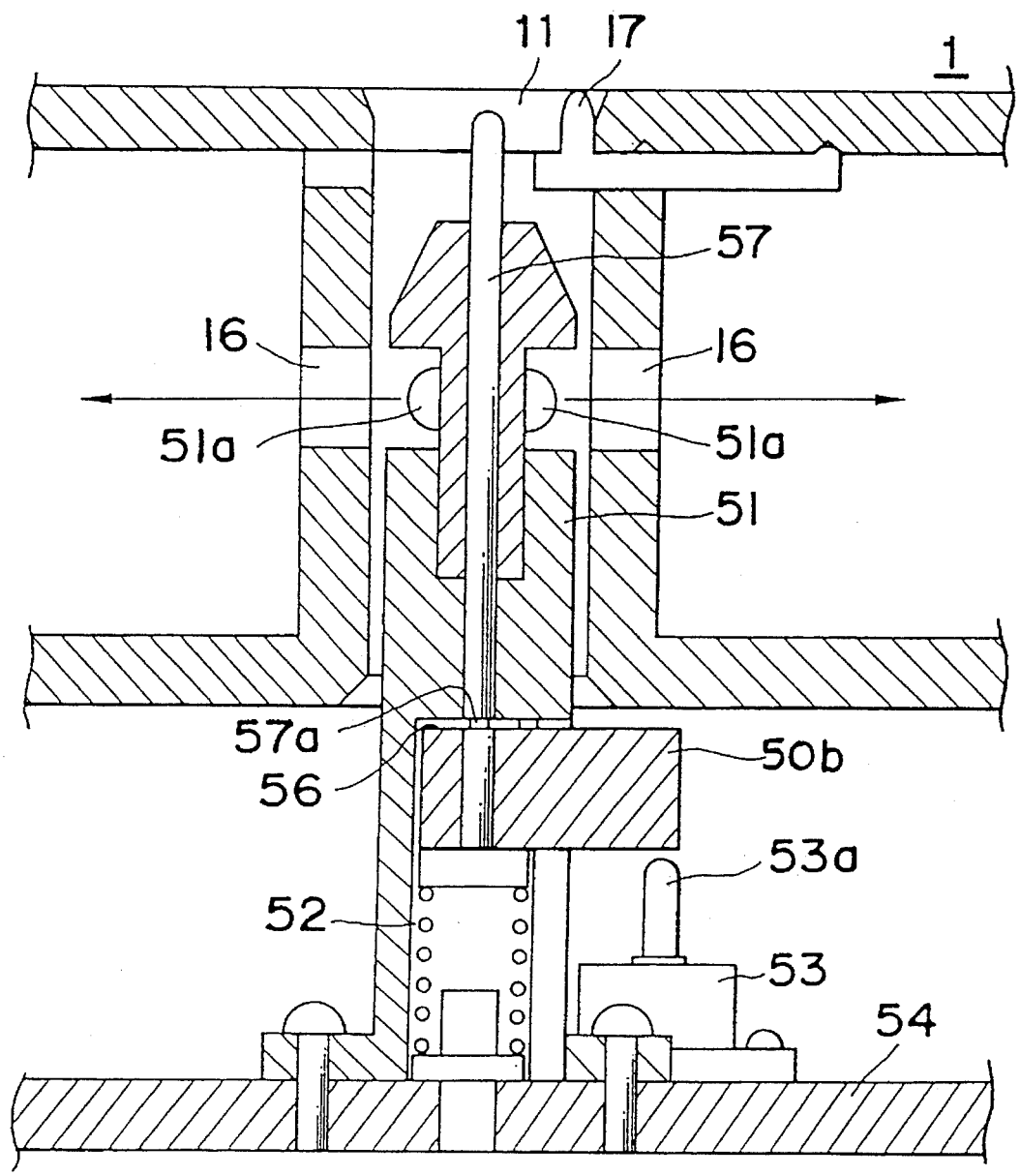
FIG. 14 is a sectional view showing the operation (OFF state) of the cassette information-detection mechanism of the magnetic recording/reproducing device according to the second embodiment.

FIG. 14 shows a state in which the distinguishing member 17 is moved away from the lower position and as a result, the insertion opening 11 is opened and the detecting pin 57 is placed at the upper position. At this time, the arm 50b mounted on the detection pin 57 disengages from the terminal 53a of the sensor 53. As a result, the sensor 53 is turned off. Similarly to FIG. 13, beams emitted by the emission element 51 pass through the projecting window 16 of the case 1 and are introduced toward the light-receiving element as shown by arrows.

As apparent from the foregoing description, whether or not the distinguishing member 17 provided in the insertion opening 11 is ON or OFF is detected without preventing the function of detection the ends of the tape. Thus, recorded information of the tape cassette can be transmitted to the magnetic recording/reproducing device and a favorable recording and reproduction can be performed. In addition, the configuration of the emission element 51 according to the first embodiment is as simple as that of the conventional one and thus the magnetic recording/reproducing device having a simple construction can be manufactured at a low cost and further is reliable in its operation.

According to the present invention, the first distinguishing member is provided in an upper portion of the insertion opening into which the emission element is inserted. Therefore, the projecting section which is inserted into the insertion opening and the second distinguishing member can be accommodated both in a larger size tape cassette and a smaller size tape cassette. The internal construction of the device can be simplified as compared with the construction in which the first distinguishing member is disposed in the rear corner of the case. In addition, the first distinguishing member can be appropriately disposed in a space formed by utilizing the upper portion of the insertion opening. Therefore, parts can be appropriately mounted in the smaller size tape cassette with the detection optical path placed at an appropriate position.

According to the magnetic recording/reproducing device, a tape cassette having a function of detection the state of the tape cassette is mounted in the opening for detection the leading and rear ends of a tape. Thus, the leading and rear ends of the tape and state of the tape cassette can be reliably detected by a simple construction. In addition, the device can be made to be compact because the reduced space of the detection mechanism.

Although the present invention has been fully described in connection with the preferred embodiments thereof with reference to the accompanying drawings, it is to be noted that various changes and modifications are apparent to those skilled in the art. Such changes and modification are to be understood as included within the scope of the present invention as defined by the appended claims unless they depart therefrom.

What is claimed is:

1. A tape cassette for use with a recording/reproducing apparatus having a light emission section with a distinguishing portion disposed thereon, said tape cassette comprising:

a main body case including an insertion opening for receiving said light emission section along with said distinguishing portion of said recording/reproducing apparatus therein, a pair of optical path windows, each window of said pair of optical path windows being disposed in each of opposite end walls of said case body for providing a detection optical path for detecting leading and rear ends of a tape interposed between said insertion opening and said pair of optical path windows;

a distinguishing member, for indicating a state of said tape cassette, disposed in an upper portion of said insertion opening and prevented from moving axially along an axis of said insertion opening, said distinguishing member being held by said main body case so as to be moveable in a non-axial direction and to therein occupy a plurality of positional states including a state for preventing said distinguishing portion of said light emission section, together with said light emission section, from fully extending upward within said insertion opening.

2. A tape cassette as in claim 1, wherein said distinguishing member is rotatably mounted in an upper portion of said insertion opening.

3. A tape cassette as in claim 1, wherein a mechanism for holding said distinguishing member in each respective positional state is disposed between said distinguishing member and said main body case.

4. A tape cassette as in claim 1, wherein said distinguishing member is supported to be horizontally slidable.

5. A tape cassette as defined in claim 1, wherein said main case body is provided with partition walls which define said insertion opening in which projecting windows are provided to permit passage of said optical path.

6. A magnetic recording/reproducing device accommodated in a tape cassette comprising, in combination:

said tape cassette including a main body case having an insertion opening in a central portion of said main body case, a pair of optical path windows, each window of said pair of optical path windows being disposed in each of opposite end walls of said case body for providing a detecting optical path for detecting leading and rear ends of a tape interposed between said insertion opening and said pair of optical path windows;

a distinguishing member, for indicating a state of said tape cassette, disposed in an upper portion of said insertion opening and prevented from moving axially along an axis of said insertion opening, said distinguishing member being held by said main body case so as to be movable in a non-axial direction to therein occupy a plurality of positional states;

a distinguishing portion slidably movable within said insertion opening and coaxial with an emission section for emitting light through said optical path windows for detection of said leading and rear ends of said tape, an urging means for urging said distinguishing portion upward, an arm integral with said distinguishing portion and vertically slidable therewith, and a sensor which is turned on or off according to the vertical position of said arm, wherein one of said plurality of positional states occupied by said distinguishing member prevents said distinguishing portion, together with said light emission section, from fully extending upward within said insertion opening.

7. A magnetic recording/reproducing device accommodated in a tape cassette as in claim 6, wherein said distinguishing member of said cassette is supported to be horizontally slidable.

8. A magnetic recording/reproducing device comprising in combination:

a tape cassette including a main body case having an insertion opening disposed in said main body case, a pair of optical path windows, each window of said pair of optical path windows being disposed in each of opposite end walls of said case body for providing a detecting optical path for detecting leading and rear ends of a tape interposed between said insertion opening and said pair of optical path windows;

a distinguishing member, for indicating a state of said tape cassette, disposed in an upper portion of said insertion opening and prevented from moving axially along an axis of said insertion opening, said distinguishing member being held by said main body case so as to be movable in a non-axial direction to therein occupy a plurality of positional states; and a distinguishing portion comprising a distinguishing pin that is eccentrically positioned with respect to an emission section inclusive of a light-projecting section and is vertically slidable within said insertion opening such that one of said plurality of positional states occupied by said distinguishing member prevents said distinguishing portion, together with said light emission section, from fully extending upward with said light-projecting section within said insertion opening.

9. A magnetic recording/reproducing device accommodated in a tape cassette as in claim 8, wherein said distinguishing member of said cassette is supported to be rotatably slidable.

* * * * *